United States Patent
Shiau

(10) Patent No.: US 9,645,446 B2
(45) Date of Patent: May 9, 2017

(54) LIQUID CRYSTAL PANEL AND MANUFACTURING METHOD THEREOF

(71) Applicant: AU Optronics Corp., Hsin-Chu (TW)

(72) Inventor: Yi-Hau Shiau, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 57 days.

(21) Appl. No.: 14/668,953

(22) Filed: Mar. 25, 2015

(65) Prior Publication Data

US 2016/0195741 A1   Jul. 7, 2016

(30) Foreign Application Priority Data

Jan. 7, 2015   (TW) .............. 104100445 A

(51) Int. Cl.
  *G02F 1/1337*   (2006.01)
  *G02F 1/1339*   (2006.01)
  G02F 1/1333   (2006.01)

(52) U.S. Cl.
  CPC .......... *G02F 1/1337* (2013.01); *G02F 1/1339* (2013.01); *G02F 2001/133388* (2013.01); *G02F 2201/50* (2013.01)

(58) Field of Classification Search
  CPC .............. G02F 1/1337; G02F 1/133711; G02F 1/134363; G02F 1/133788; G02F 1/133753; G02F 1/1339; G02F 1/1341; G02F 1/1345; G02F 2001/13415
  USPC ......................................... 349/123, 153, 190
  See application file for complete search history.

(56) References Cited

U.S. PATENT DOCUMENTS

| 5,948,577 A * | 9/1999 | Nakazawa ............. B41M 3/003 349/106 |
| 6,468,702 B1 * | 10/2002 | Yi .......................... G02B 5/201 347/106 |
| 2007/0297076 A1 | 12/2007 | Kim |
| 2014/0176847 A1 * | 6/2014 | Sung ................... H01L 51/5246 349/58 |
| 2015/0226990 A1 * | 8/2015 | Miyazaki .............. G02F 1/1339 349/123 |

FOREIGN PATENT DOCUMENTS

| CN | 1612006 A | 5/2005 |
| CN | 101435956 A | 5/2009 |

* cited by examiner

*Primary Examiner* — Huyen Ngo
(74) *Attorney, Agent, or Firm* — Locke Lord LLP; Tim Tingkang Xia, Esq.

(57) ABSTRACT

A liquid crystal panel has a display region and a peripheral region surrounding the display region. The liquid crystal panel includes a first substrate, a second substrate, a liquid crystal layer, a first alignment layer, a second alignment layer and at least one patterned water repellent layer. The first substrate is disposed opposite to the second substrate. The liquid crystal layer is disposed between the first substrate and the second substrate. The first alignment layer is disposed on the first substrate, and the second alignment layer is disposed on the second substrate. The patterned water repellent layer is disposed on the first substrate and/or on the second substrate. The patterned water repellent layer is disposed in the peripheral region. A thickness of the patterned water repellent layer is less than or equal to a thickness of the first alignment layer or a thickness of the second alignment layer.

21 Claims, 12 Drawing Sheets

LIQUID CRYSTAL PANEL AND MANUFACTURING METHOD THEREOF

BACKGROUND OF THE INVENTION

1. Field of the Invention

The present invention relates to liquid crystal panel and a manufacturing method thereof, and more particularly to a liquid crystal panel using a patterned water repellent layer to control a region of an alignment layer and a manufacturing method of the liquid crystal panel.

2. Description of the Prior Art

In liquid crystal panels, an alignment material layer is generally formed on an inner surface of a substrate for controlling alignment conditions of liquid crystal molecules near the substrate such as an array substrate and/or a color filter substrate. Grooves aligned along a specific direction are formed on the alignment material layer by a rubbing process so as to control a pre-tilt angle of the liquid crystal molecules formed subsequently. Conventionally, the alignment material layer mentioned above is formed by a transfer printing process. However, for large size panel production, there are many problems in manufacturing process and costs because equipment of the transfer printing process such as an APR rubber plate has to become bigger, and required space of the equipment is increased. Accordingly, an inkjet process for forming alignment material layers becomes a solution for the problems mentioned above. The alignment material sprayed by the inkjet process is liquid, and a retaining wall with a much larger thickness is required to control the liquid alignment material in a specific distribution region. However, additional processes are required for forming the retaining wall, and the total manufacturing processes and the structural design are affected accordingly.

SUMMARY OF THE INVENTION

It is one of the objectives of the present invention to provide a liquid crystal panel and a manufacturing method thereof. A patterned water repellent layer is used to control distribution of an alignment layer, and purposes of simplifying the manufacturing process and enhancing structural design variability may be achieved accordingly.

To achieve the purposes described above, a liquid crystal panel is provided in one embodiment of the present invention. The liquid crystal panel has a display region and a peripheral region. The peripheral region surrounds the display region. The liquid crystal panel includes a first substrate, a second substrate, a liquid crystal layer, a first alignment layer, a second alignment layer, and at least one patterned water repellent layer. The second substrate is disposed opposite to the first substrate. The liquid crystal layer is disposed between the first substrate and the second substrate. The first alignment layer is disposed on the first substrate, and the second alignment layer is disposed on the second substrate. The patterned water repellent layer is disposed on the first substrate and/or the second substrate. The patterned water repellent layer is disposed in the peripheral region, and a thickness of the patterned water repellent layer is less than or equal to a thickness of the first alignment layer or a thickness of the second alignment layer.

To achieve the purposes described above, a manufacturing method of a liquid crystal panel is provided in another embodiment of the present invention. The manufacturing method of the liquid crystal panel includes the following steps. First, a first substrate and a second substrate are provided. A patterned water repellent layer is then formed on at least one of the first substrate or the second substrate. An alignment layer is formed on the first substrate with the patterned water repellent layer formed thereon or the second substrate with the patterned water repellent layer formed thereon. The patterned water repellent layer surrounds the alignment layer, and a thickness of the patterned water repellent layer is less than or equal to a thickness of the alignment layer. A liquid crystal layer is then formed between the first substrate and the second substrate.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, embodiments are detailed as follows. The embodiments of the present invention are illustrated in the accompanying drawings with numbered elements to clarify the contents and effects to be achieved.

Figure 1:
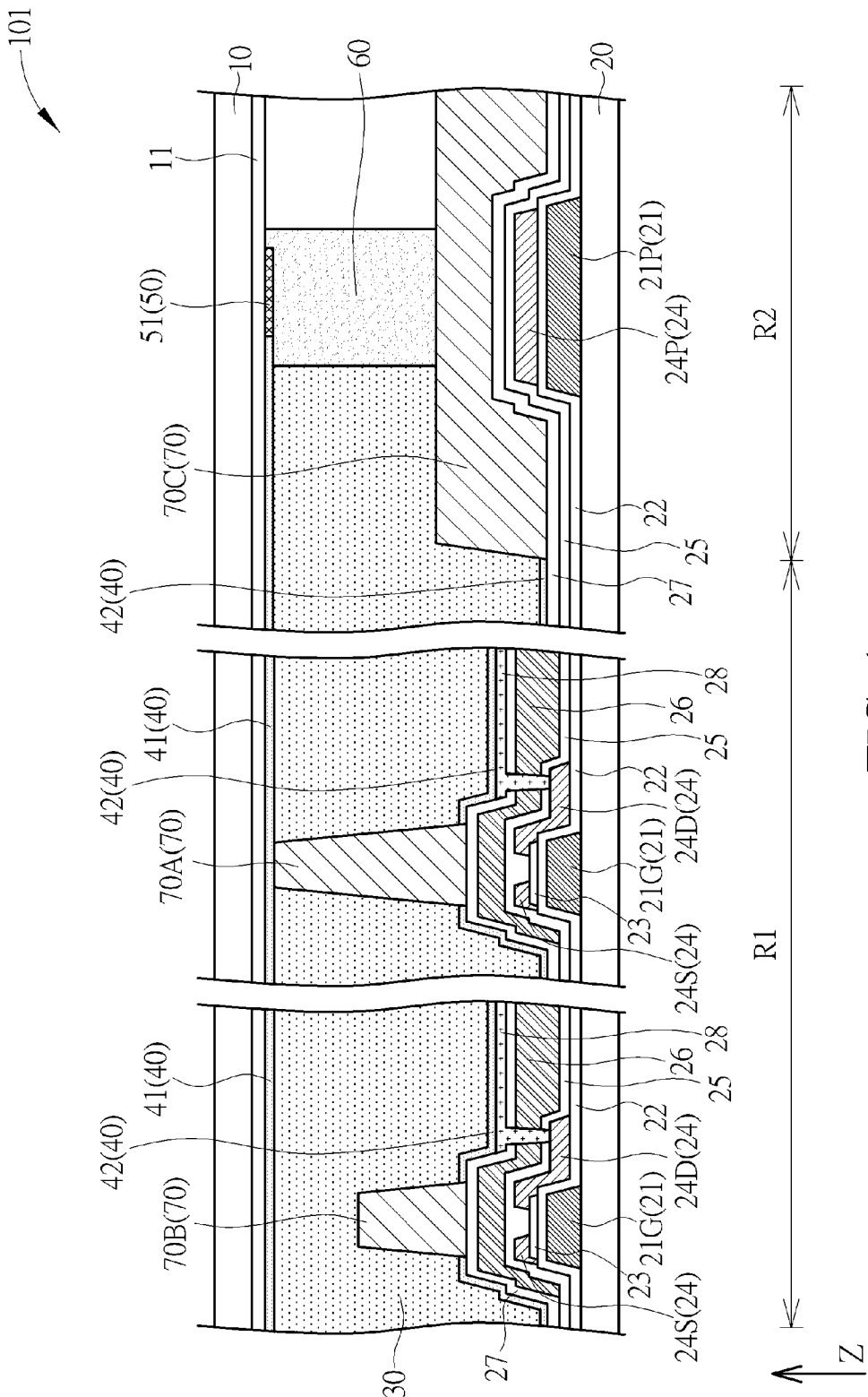
FIG. 1 is a schematic diagram illustrating a liquid crystal panel according to a first embodiment of the present invention.
Figure 2:
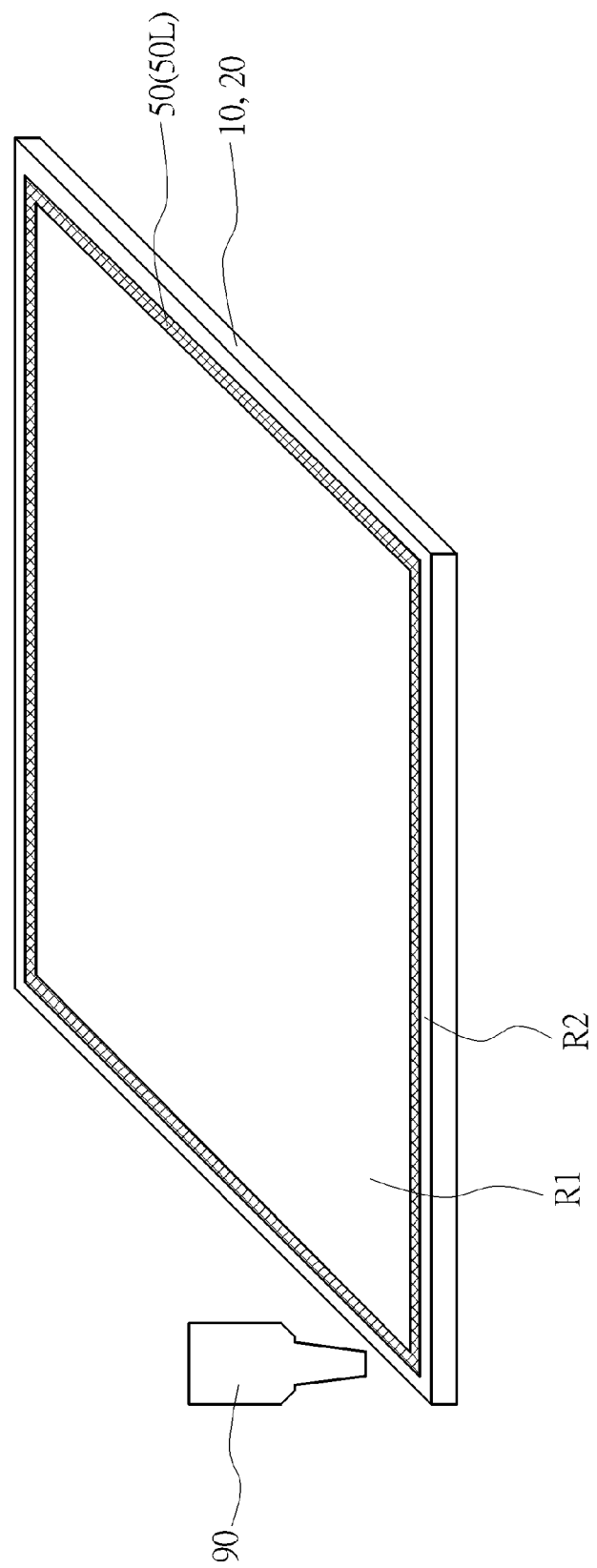
FIG. 2 and FIG. 3 are schematic diagrams illustrating a manufacturing method of the liquid crystal panel according to the first embodiment of the present invention.
Figure 3:
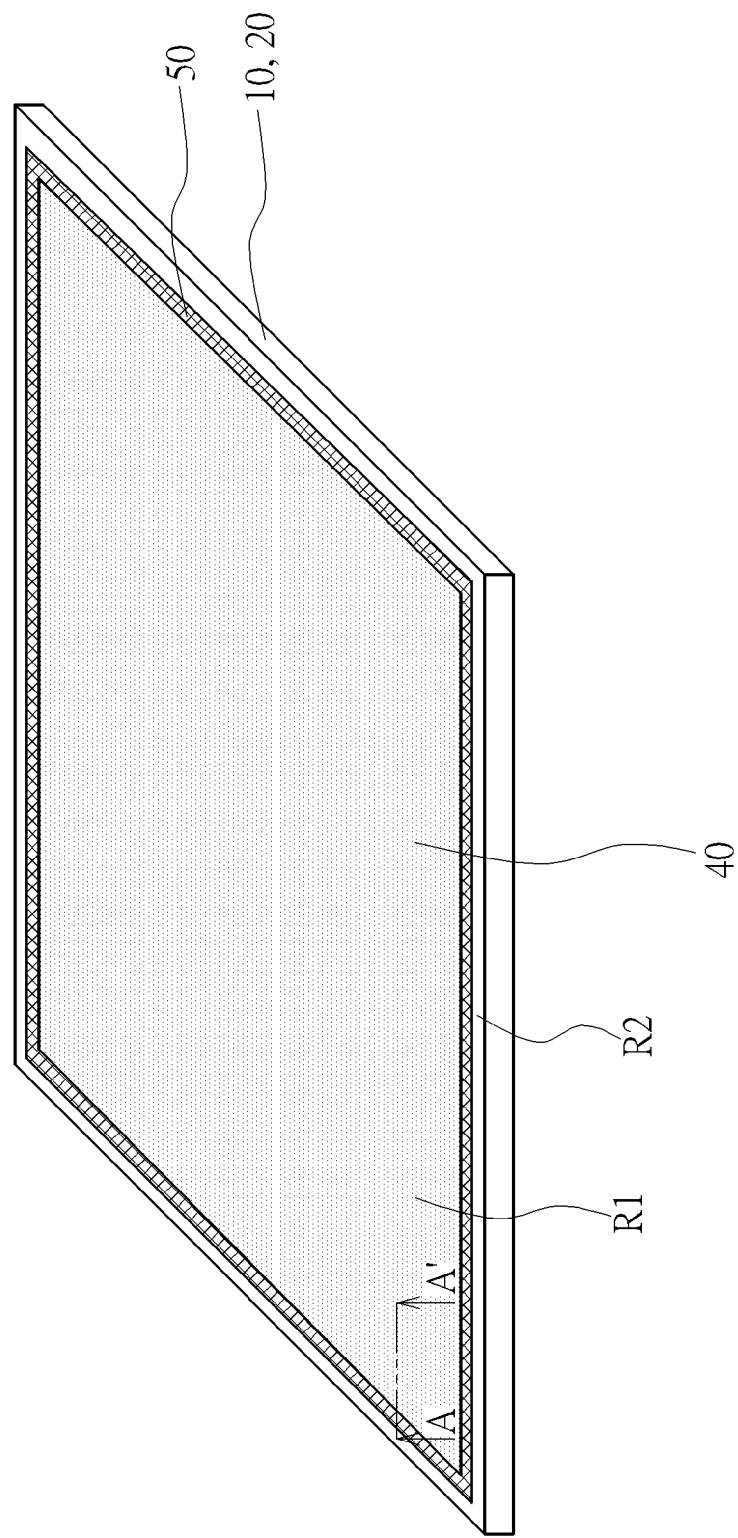
Figure 4:
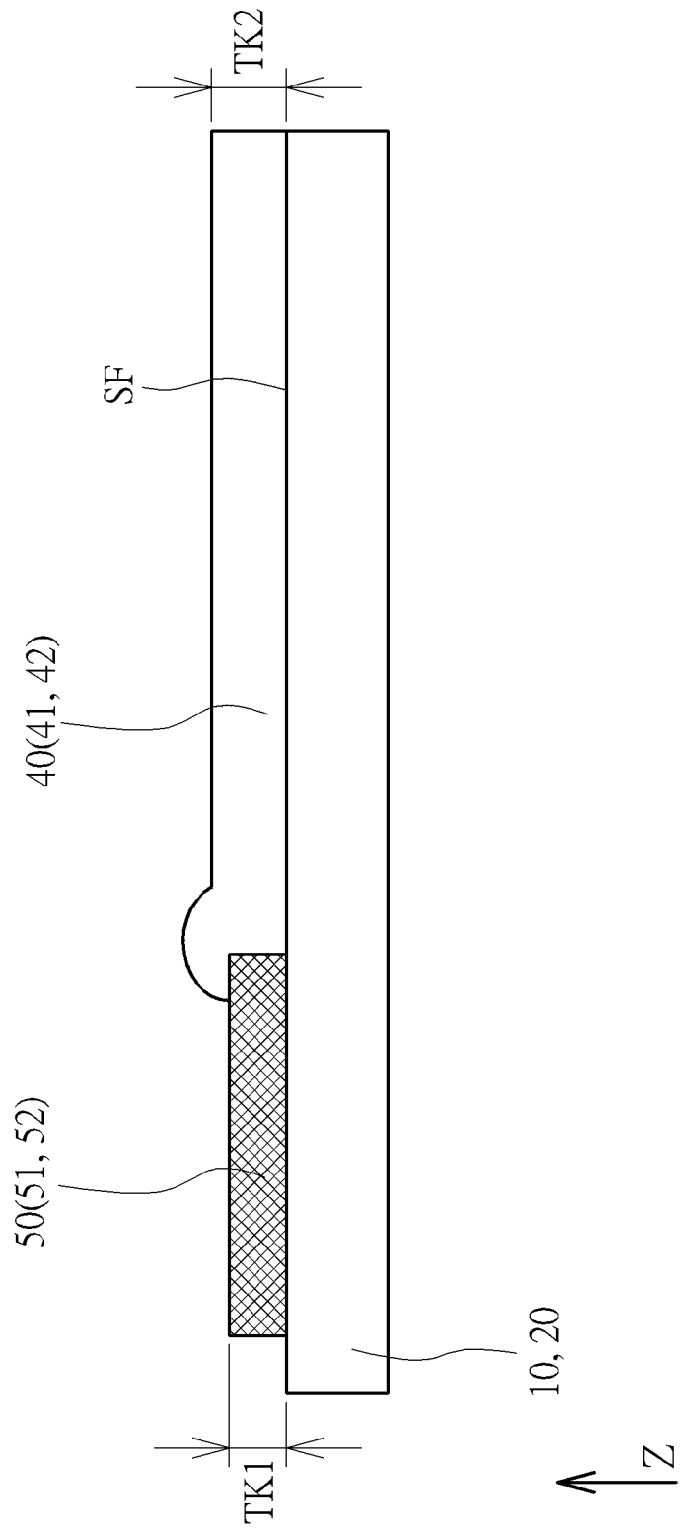
FIG. 4 is a schematic cross-sectional diagram taken along a line A-A' in FIG. 3.

Please refer to FIGS. 1-4. FIG. 1 is a schematic diagram illustrating a liquid crystal panel according to a first embodiment of the present invention. FIG. 2 and FIG. 3 are schematic diagrams illustrating a manufacturing method of the liquid crystal panel in this embodiment. FIG. 4 is a schematic cross-sectional diagram taken along a line A-A' in FIG. 3. Please note that the figures are only for illustration and the figures may not be to scale. The scale may be further modified according to different design considerations. As shown in FIG. 1, a liquid crystal panel 101 is provided in this embodiment. The liquid crystal panel 101 has a display region R1 and a peripheral region R2. The peripheral region R2 surrounds the display region R1. The liquid crystal panel 101 includes a first substrate 10, a second substrate 20, a liquid crystal layer 30, a first alignment layer 41, a second alignment layer 42, and at least one patterned water repellent layer 50. The second substrate 20 is disposed opposite to the first substrate 10. The first substrate 10 and the second substrate 20 may include a rigid substrate such as a glass substrate and a ceramic substrate, a flexible substrate such as a plastic substrate, or a substrate made of other appropriate materials respectively. The liquid crystal layer 30 is disposed between the first substrate 10 and the second substrate 20. The first alignment layer 41 is disposed on the first substrate 10, and the second alignment layer 42 is disposed on the second substrate 20. The patterned water repellent layer 50 is disposed on the first substrate 10 and/or the second substrate 20. The patterned water repellent layer 50 is disposed in the peripheral region R2, and a thickness of the patterned water repellent layer 50 is less than or equal to a thickness of the first alignment layer 41 or a thickness of the second alignment layer 42.

More specifically, the patterned water repellent layer 50 in this embodiment includes a first patterned water repellent layer 51 disposed on the first substrate 10. A surface tension of the patterned water repellent layer 50 is lower than a surface tension of the first alignment layer 41 and/or a surface tension of the second alignment layer 42, and the surface tension of the patterned water repellent layer 50 ranges between 13 dyne/cm and 30 dyne/cm preferably, but not limited thereto. The patterned water repellent layer 50 may include a fluoride water repellent material, a silicon based water repellent material, or other appropriate materials having low surface tension and capable of repelling water. The fluoride water repellent material mentioned above may include a fluoride polymer formed by an emulsion polymerization of fluoroalkyl acrylate monomers [$F(CF_2)_nCH_2CH_2OCOCH=CH_2$], alkyl acrylate monomers [$H(CH_2)_nCH_2CH_2OCOCH=CH_2$)], and bridge monomers ($X$—$CH=CH_2$), but not limited thereto. The silicon based water repellent material mentioned above may include reactive silane, siloxane resins with cross-linkable side chains, or polymer organic silicon compound such as elastomeric polydimethylsiloxane, but not limited thereto.

Additionally, the liquid crystal panel 101 may further include a sealant layer 60 and a common electrode 11. The sealant layer 60 is disposed between the first substrate 10 and the second substrate 20, the sealant layer 60 is disposed in the peripheral region R2, and the sealant layer 60 covers at least a part of the patterned water repellent layer 50. The common electrode 11 is disposed on the first substrate 10, and the first patterned water repellent layer 51 is disposed on the common electrode 11. The first alignment layer 41 contacts the first patterned water repellent layer 51 and is also disposed on the common electrode 11. A thickness of the first patterned water repellent layer 51 is less than or equal to the thickness of the first alignment layer 41. In other words, the patterned water repellent layer 50 and the first alignment layer 41 in the peripheral region R2 are disposed on a same plane of the common electrode. In this embodiment, the second substrate 20 is a color filter on array (COA) substrate preferably, and the first substrate 10 is a counter substrate preferably. The common electrode 11, the first alignment layer 41, and the first patterned water repellent layer 51 may be disposed on the first substrate 10. A gate electrode 21G, a first contact pad 21P, a gate insulation layer 22, a semiconductor layer 23, a source electrode 24S, a drain electrode 24D, a second contact pad 24P, a first protection layer 25, ad color filter layer 26, a second protection layer 27, a pixel electrode 28, and a patterned light shielding layer 70 may be selectively disposed on the second substrate 20.

The gate electrode 21G is disposed in the display region R1, and the first contact pad 21P is disposed in the peripheral region R2. The gate electrode 21G and the first contact pad 21P may be formed by an identical conductive layer such as a first patterned conductive layer 21, but not limited thereto. The source electrode 24S and the drain electrode 24D are disposed in the display region R1, and the second contact pad 24P is disposed in the peripheral region R2. The source electrode 24S, the drain electrode 24D, and the second contact pad 24P may be formed by an identical conductive layer such as a second patterned conductive layer 24, but not limited thereto. The first conductive layer 21 and the second conductive layer 24 mentioned above may include a metallic material containing at least one of aluminum (Al), copper (Cu), silver (Ag), chromium (Cr), titanium (Ti), and molybdenum (Mo), a stack layer of the above-mentioned materials, or an alloy of the above-mentioned materials, but the present invention is not limited to this. Other appropriate conductive materials may be used to form the first conductive layer 21 and the second conductive layer 24.

The first protection layer 25 covers a thin film transistor including the gate electrode 21G, the gate insulation layer 22, the semiconductor layer 23, the source electrode 24S, and the drain electrode 24D. The color filter layer 26 is disposed on the first protection layer 25. The second protection layer 27 covers the color filter layer 26, and the pixel electrode 28 is disposed on the second protection layer 27. The pixel electrode 28 may contact and be electrically connected to a corresponding drain electrode 24D through an opening penetrating the second protection layer 27, the color filter layer 26, and the first protection layer 25. The second alignment layer 42 may be partially disposed on the pixel electrode 28. In addition, the patterned light shielding layer 70 in this embodiment may include a first light shielding spacer 70A, a second light shielding spacer 70B, and a light shielding frame 70C. The first light shielding spacer 70A and the second light shielding spacer 70B are disposed in the display region R1. By a process such as a half tone photolithography process, the thickness of the first light shielding spacer 70A may be different from the thickness of the second light shielding spacer 70B so as to keep the cell gap, but not limited thereto. The light shielding frame 70C is disposed in the peripheral region R2 and covers the first contact pad 21P and the second contact pad 24P in a vertical projective direction Z. At least a part of the first contact pad 21P and/or the second contact pad 24P may be electrically connected to the common electrode 11 through an opening (not shown) in the light shielding frame 70C and conductive particles (not shown) in the sealant layer 60, but not limited thereto. It is worth noting that the patterned light shielding layer 70 is disposed on the second substrate 20 which is a COA substrate, and the liquid crystal panel 101 in this embodiment may be regarded as a black matrix on array (BOA) panel accordingly, but not limited thereto. In the BOA panel structure of this embodiment, there is no pattern shielding layer formed on the first substrate 10, and the first patterned water repellent layer 51 may be used to control the distribution region of the first alignment layer on the first substrate 10.

As shown in FIGS. 1-4, the manufacturing method of the liquid crystal panel 101 in this embodiment includes the following steps. First, the first substrate 10 and the second substrate 20 are provided. As shown in FIG. 2, a patterned water repellent layer 50 is then formed on at least one of the first substrate 10 or the second substrate 20. A forming method of the patterned water repellent layer 50 may include forming a liquid water repellent 50L by a nozzle 90 in an inkjet process. The liquid water repellent 50L may include a water repellent material, a solvent, and other required materials. The water repellent material mentioned above may include a fluoride water repellent material, a silicon based water repellent material, or other appropriate materials having low surface tension and capable of repelling water. The solvent mentioned above may include a non-polar solvent, a polar aprotic solvent, or a polar protic solvent. The non-polar solvent may include pentane, cyclopentane, hexane, cyclohexane, benzene, toluene, 1,4-dioxane, chloroform, diethyl ether, or other appropriate non-polar solvents. The polar aprotic solvent may include dichloromethane (DCM), tetrahydrofuran (THF), ethyl acetate, acetone, dimethyl formamide (DMF), acetonitrile (MeCN), dimethyl sulfoxide (DMSO), propylene carbonate, or other appropriate polar aprotic solvents. The polar protic solvent may include formic acid, n-butanol, isopropanol (IPA), n-propanol, ethanol, methanol, acetic acid, water, or other appropriate polar protic solvents. In addition, other kinds of solvent such as n-pentyl alcohol or butyl acetate may also be applied in the solvent of this embodiment. The patterned water repellent layer 50 may be formed after the solvent in the liquid water repellent 50L is evaporated. The evaporation speed of the solvent in the liquid water repellent 50L and the mixing condition between the solvent and a variety of the water repellent materials may be controlled by choosing the components of the solvent mentioned above. It is worth noting that the forming method of the patterned water repellent layer 50 in the present invention is not limited to this, and other processes such as a photolithography process may also be used to form the patterned water repellent layer 50.

As shown in FIG. 3 and FIG. 4, an alignment layer 40 is then formed on the first substrate 10 with the patterned water repellent layer 50 formed thereon or the second substrate 20 with the patterned water repellent layer 50 formed thereon. The alignment layer 40 is the first alignment layer 41 mentioned above while the alignment layer 40 is formed on the first substrate 10. The alignment layer 40 is the second alignment layer 42 mentioned above while the alignment layer 40 is formed on the second substrate 20. It is worth noting that other components on the first substrate 10 and the second substrate 20 such as the common electrode 11, the gate electrode 21G, the first contact pad 21P, the gate insulation layer 22, the semiconductor layer 23, the source electrode 24S, the drain electrode 24D, the second contact pad 24P, the first protection layer 25, the color filter layer 26, the second protection layer 27, the pixel electrode 28, and the patterned light shielding layer 70 may be formed before the pattern water repellent layer 50 and the alignment layer 40 are formed on the first substrate 10 and the second substrate 20 respectively. Additionally, the alignment layer 40 in this embodiment is formed by an inkjet process preferably, and the inkjet process of the alignment layer 40 may be integrated with the inkjet process of the patterned water repellent layer 50 so as to simplifying the total processes. In addition, the patterned water repellent layer 50 surrounds the alignment layer 40, and a thickness of the patterned water repellent layer 50 is less than or equal to a thickness of the alignment layer 40. For instance, the patterned water repellent layer 50 may have a first thickness TK1, the alignment layer 40 may have a second thickness TK2, and the first thickness TK1 is less than or equal to the second thickness TK2. A surface tension of the patterned water repellent layer 50 is lower than a surface tension of the alignment layer 40 preferably. Therefore, the alignment layer 40 in a liquid state will be hard to flow outside the patterned water repellent layer 50 when the thickness of the alignment layer 40 in the liquid state is larger than the thickness of the patterned water repellent layer 50 and the alignment layer 40 in the liquid state overflows onto the patterned water repellent layer 50 because the patterned water repellent layer 50 with relatively lower surface tension may be used to keep the alignment layer 40 from flowing across the patterned water repellent layer 50. Although the patterned water repellent layer 50 and the alignment layer 40 in the present invention are formed and disposed on a same plane SF of the first substrate 10 and/or the second substrate 20 and the thickness of the patterned water repellent layer 50 is less than or equal to the thickness of the alignment layer 40, the patterned water repellent layer 50 is still capable of keeping the alignment layer 40 from overflowing because the surface tension of the patterned water repellent layer 50 is relatively lower. Additionally, the amount of the materials may be reduced, the influence on the surface uniformity and the distribution of the liquid crystal may be improved, and adhesion of the sealant layer formed subsequently may be enhanced because the thickness requirement of the patterned water repellent layer 50 in the present invention is relatively low. The advantages mentioned above will benefit the manufacturing process and the costs. Comparatively, in the conventional art, much higher retaining walls are used to control liquid alignment materials, and it has disadvantages such as complicated processes, worse surface uniformity on the peripheral region of the substrate, and more limitations on the design and allocations of the circuits and components in the peripheral region of the substrate.

For example, polyimide is a general material of the alignment layer, and a surface tension of polyimide ranges between 45 dyne/cm and 50 dyne/cm approximately. A surface tension of a glass substrate is higher than 30 dyne/cm approximately. Therefore, the surface tension of the patterned water repellent layer 50 may range between 13 dyne/cm and 30 dyne/cm preferably for providing a required water repelling effect, but not limited thereto. It is worth noting that the overflow condition of the alignment layer 40 may also be controlled by adjusting the width of the patterned water repellent layer 50. For instance, in an experiment of dropping polyimide on the substrate tilted by 5 degrees, one drop of the polyimide equals 200 microliters, and it takes more than 5 drops of the polyimide to make the polyimide flow outside of the patterned water repellent layer 50 while the thickness of the patterned water repellent layer 50 is less than 0.1 micrometer, and the width of the patterned water repellent layer 50 is around 380 micrometers. When the width of the patterned water repellent layer 50 is increased to be around 1500 micrometers, it takes more than 12 drops of the polyimide to make the polyimide flow outside of the patterned water repellent layer 50 in the experiment mentioned above. In other words, the ability to retain the alignment layer 40 is relatively enhanced as the width of the patterned water repellent layer 50 increases. Comparatively, without the patterned water repellent layer 50, it only takes more than 1 drop of the polyimide to make the polyimide flow outside of the conventional retaining wall in the experiment mentioned above, even the thickness of the retaining wall is about 3 micrometers and the width of the retaining wall is around 5000 micrometers. Therefore, the patterned water repellent layer 50 in the present invention may provide better water blocking and water repelling effects than the conventional retaining wall as the patterned water repellent layer 50 is thinner and narrower than the conventional retaining wall.

Figure 5:
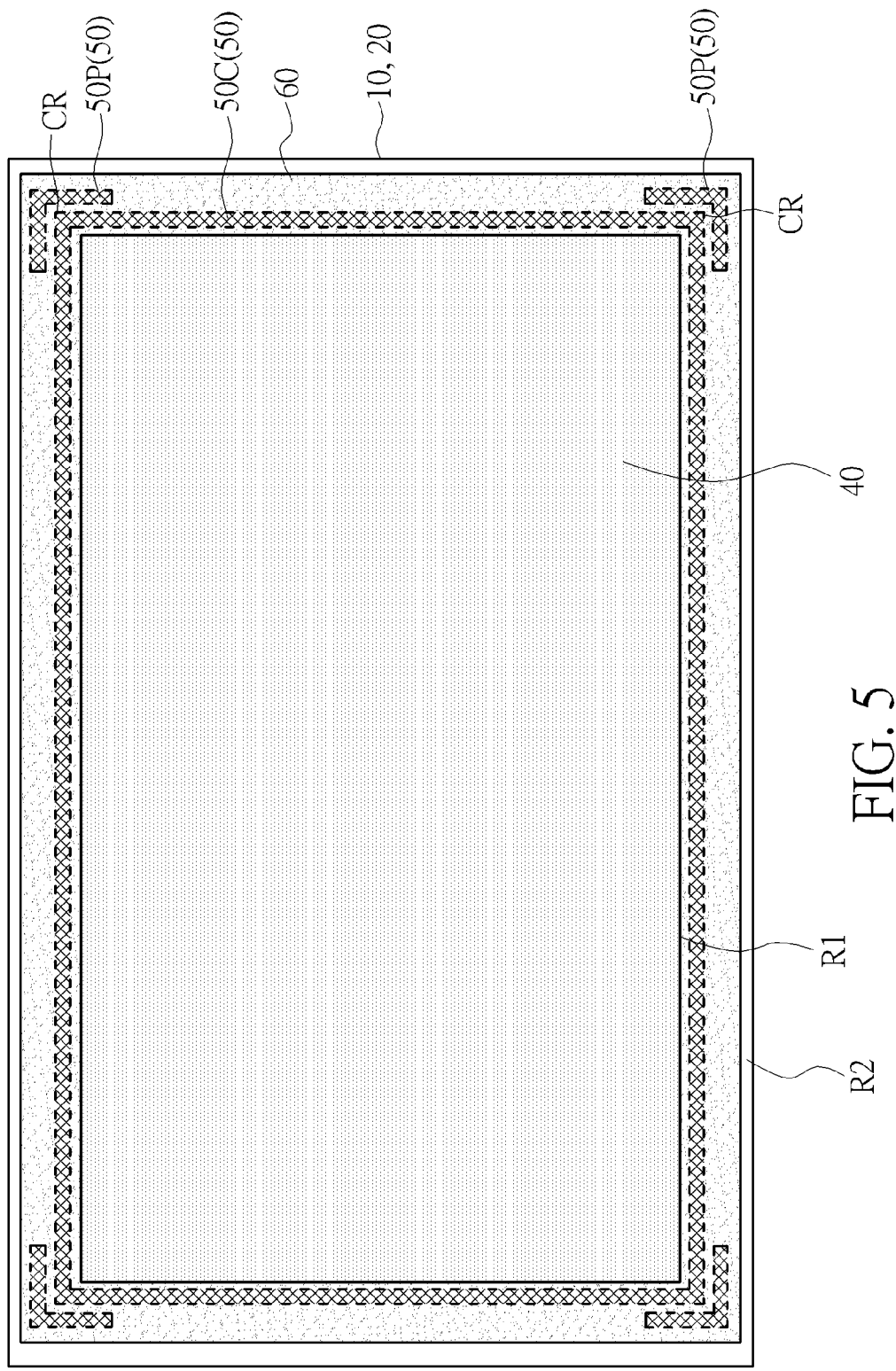
FIG. 5 is a schematic diagram illustrating a patterned water repellent layer according to another embodiment of the present invention.
Figure 6:
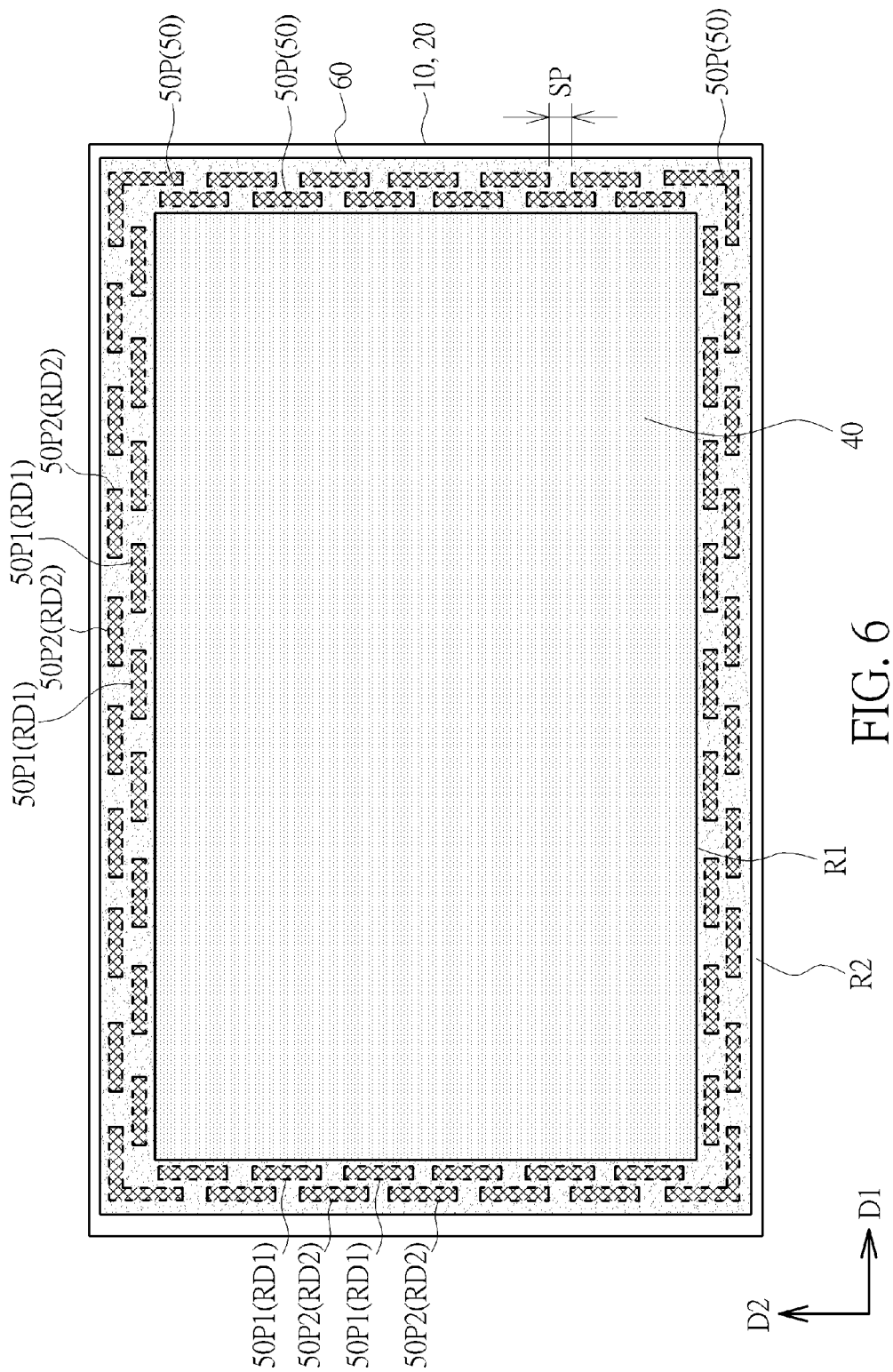
FIG. 6 is a schematic diagram illustrating a patterned water repellent layer according to further another embodiment of the present invention.
Figure 7:
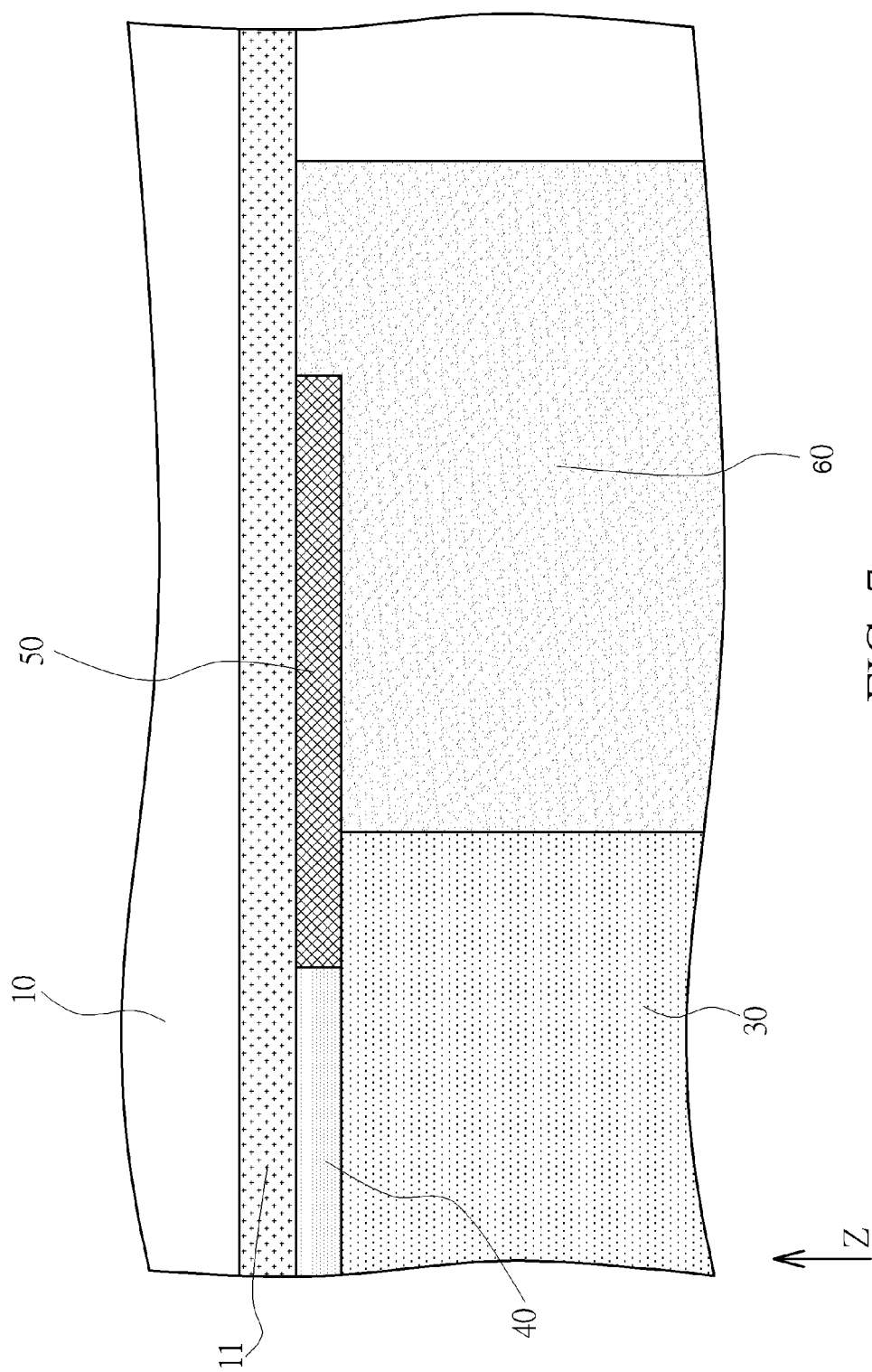
FIG. 7 is a schematic diagram illustrating a condition between a patterned water repellent layer and a sealant layer according to another embodiment of the present invention.
Figure 8:
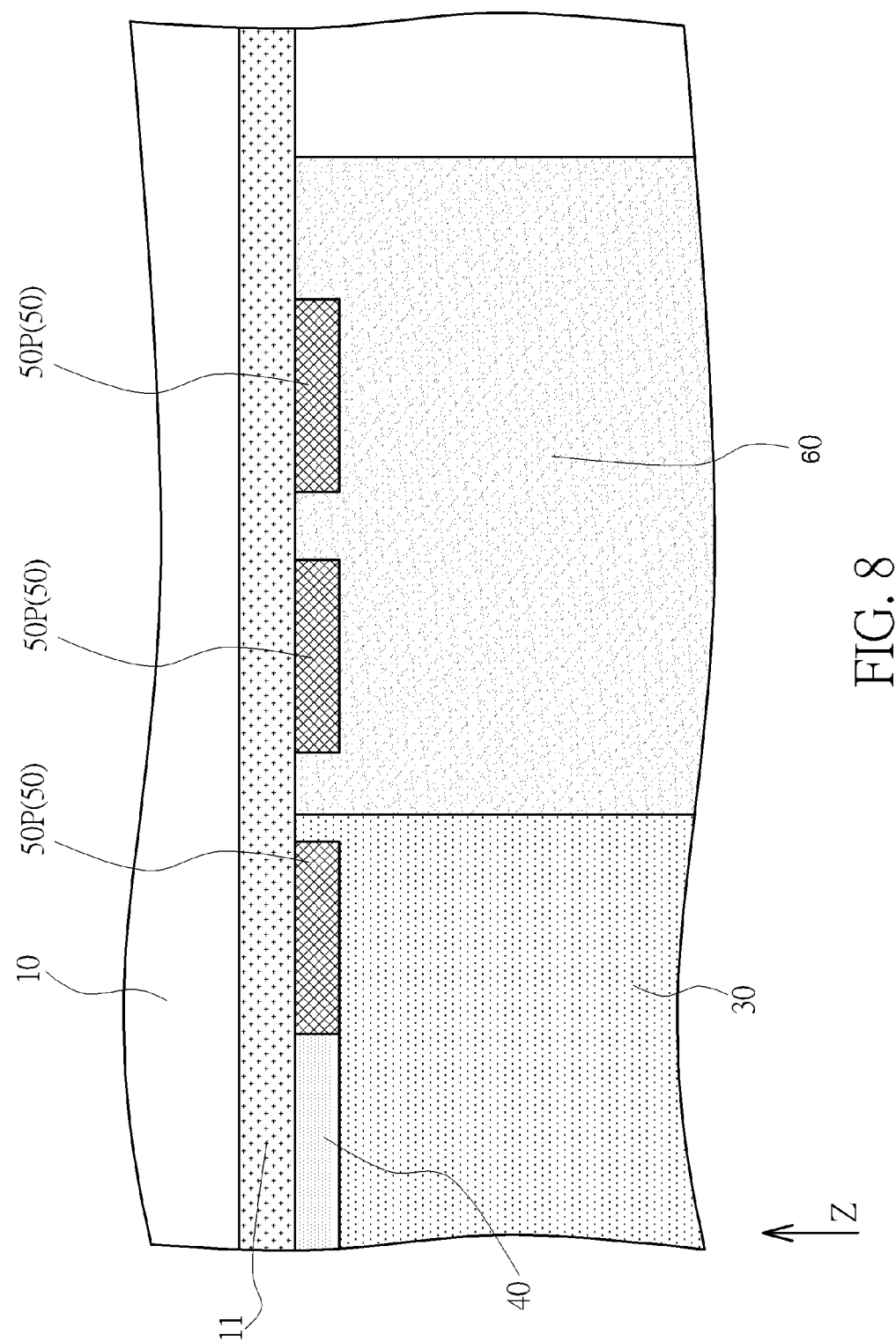
FIG. 8 is a schematic diagram illustrating a condition between a patterned water repellent layer and a sealant layer according to further another embodiment of the present invention.

As shown in FIG. 1, the liquid crystal layer 30 and the sealant layer 60 are then formed between the first substrate 10 and the second substrate 20 so as to form the liquid crystal panel 101 in this embodiment. As shown in FIG. 3, the patterned water repellent layer 50 may be a closed pattern surrounding the alignment layer 40, but the present invention is not limited to this. As shown in FIG. 5, in another embodiment of the present invention, the patterned water repellent layer 50 may include a closed pattern 50C and a plurality of block patterns 50P. The block patterns 50P may be aligned separately around corners CR of the closed pattern 50C, and the block pattern 50P may be an L-shaped pattern or a straight line pattern for reducing the material usage amount of the patterned water repellent layer 50 and keeping the liquid alignment layer from overflowing. As shown in FIG. 6, in another embodiment of the present invention, the patterned water repellent layer 50 may only include a plurality of the block patterns 50P repeatedly arranged and surrounding the alignment layer 40. The block pattern 50P may be L-shaped patterns or straight line patterns separated by spacing SP and arranged to form a plurality of concentric rings surrounding the alignment layer 40. For example, as shown in FIG. 6, a first ring RD1 is an inner ring and a second ring RD2 is an outer ring. Block patterns 50P1 in the first ring RD1 and the block patterns 50P2 in the second ring RD2 may be disposed alternately with each other, and the block pattern 50P1 may partially overlap the block pattern 50P2 along a first direction D1 and a second direction D2 parallel to a surface of the first substrate 10 or the second substrate 20. In the allocation approach mentioned above, the effect of blocking the alignment layer may be different while the positions of the block patterns 50P, the shapes of the block patterns 50P, and the spacing between the block patterns 50P are changed. In other words, the shapes and the allocation of the patterned water repellent layer 50 may be modified for further improving the overflow problems of the liquid alignment layer material. In addition, the sealant layer 60 covers at least a part of the patterned water repellent layer 50. As shown in FIG. 1, the sealant layer 60 may completely cover the patterned water repellent layer 50, but the present invention is not limited to this. Additionally, the sealant layer 60 may be designed to directly contact the common electrode 11 partially, and the sealant layer 60 may at least partially cover the lateral surface of the patterned water repellent layer 50 so as to enhance the adhesion of the sealant layer 60. As shown in FIG. 7, in another embodiment of the present invention, the sealant layer 60 may cover only a part of the patterned water repellent layer 50, and the patterned water repellent layer 50 may protrude from the sealant layer 60 in a direction to alignment layer 40. As shown in FIG. 8, in another embodiment of the present invention, the patterned water repellent layer 50 may include a plurality of the block patterns 50P, and the sealant layer 60 may cap at least a part of the block patterns 50P so as to further enhance the adhesion of the sealant layer 60. It is worth noting that the different kinds in shape of the patterned water repellent layer 50 and the allocation between the patterned water repellent layer 50 and the sealant layer 60 mentioned above may also be applied to other embodiments in the present invention.

The following description is based on different embodiments in the present disclosure. To simplify the description, the following description will focus on the differences among embodiments rather than the similar parts. Furthermore, the same reference numbers are used to describe similar elements in the description of different embodiments for convenience and clarity.

Figure 9:
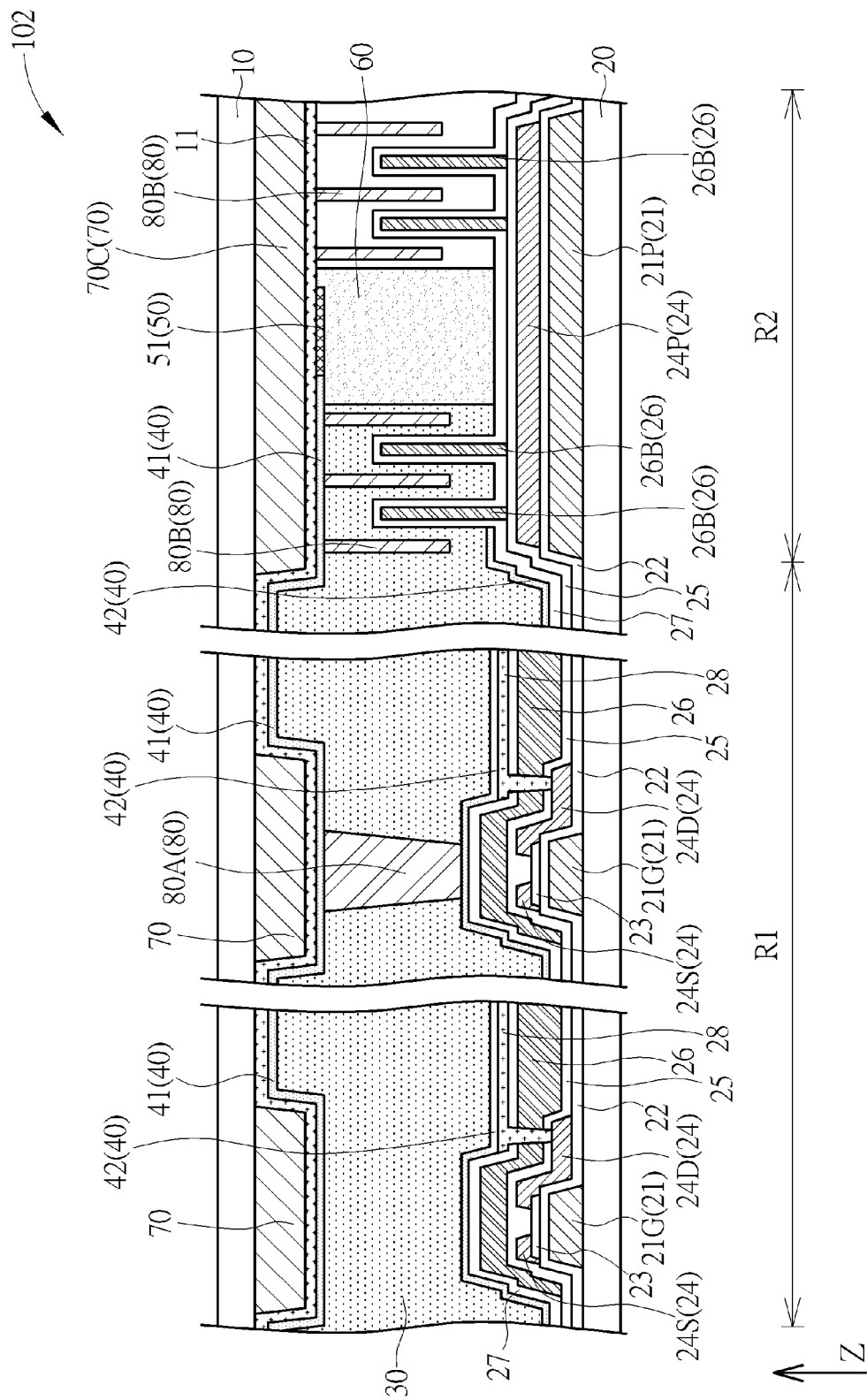
FIG. 9 is a schematic diagram illustrating a liquid crystal panel according to a second embodiment of the present invention.

Please refer to FIG. 9. FIG. 9 is a schematic diagram illustrating a liquid crystal panel according to a second embodiment of the present invention. As shown in FIG. 9, the difference between the first embodiment and a liquid crystal panel 102 in this embodiment is that the patterned light shielding layer 70 is disposed on the first substrate 10, and the liquid crystal panel 102 in this embodiment may further include a plurality of first retaining walls 80B, a plurality of second retaining walls 26B, and a spacer 80A. The first retaining wall 80B is disposed on the first alignment layer 41, and the first retaining wall 80B is disposed in the peripheral region R2. The spacer 80A is disposed on the first alignment layer 41 in the display region R1. The first retaining walls 80B and the spacer 80A may be formed by an identical spacer material 80, but not limited thereto. The second retaining wall 26B is disposed on the first protection layer 25 in the peripheral region R2. The second retaining walls 26B and the color filter layer 26 may be formed by an identical material, but not limited thereto. It is worth noting that the patterned light shielding layer 70 in this embodiment is disposed on the first substrate 10, and the second retaining wall 26B may be used to control the distribution of the second alignment layer 42 formed by the inkjet process. Additionally, the first retaining wall 80B and the second retaining wall 26B may also be used to block the liquid crystal layer 30 and avoid contamination between the liquid crystal layer 30 and the sealant layer 60.

Figure 10:
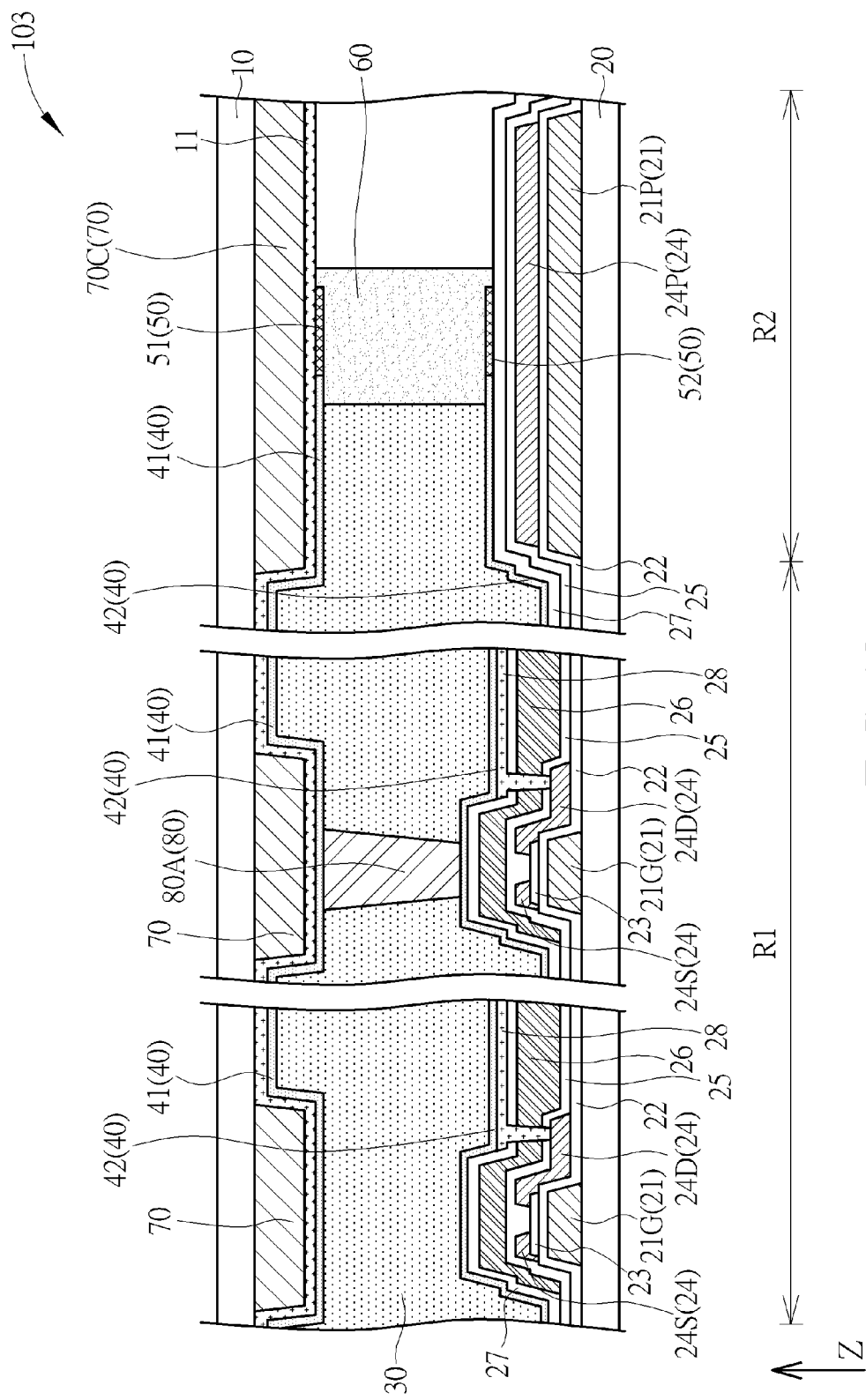
FIG. 10 is a schematic diagram illustrating a liquid crystal panel according to a third embodiment of the present invention.

Please refer to FIG. 10. FIG. 10 is a schematic diagram illustrating a liquid crystal panel according to a third embodiment of the present invention. As shown in FIG. 10, the difference between the first embodiment and a liquid crystal panel 103 in this embodiment is that, in the liquid crystal panel 103 of this embodiment, the patterned light shielding layer 70 is disposed on the first substrate 10, and the patterned water repellent layer 50 may further include a second patterned water repellent layer 52 disposed on the second substrate 20. The second alignment layer 42 contacts the second patterned water repellent layer 52, and a thickness of the second patterned water repellent layer 52 is less than or equal to the thickness of the second alignment layer 42. The manufacturing method of the second patterned water repellent layer 52 is similar to the manufacturing method of the patterned water repellent layer 50 mentioned above and will be redundantly described. It is worth noting that in the liquid crystal panel 103 of this embodiment, the patterned water repellent layer 50 may be disposed on the first substrate 10 and the second substrate 20 for controlling the first alignment layer and the second alignment layer 42 without the conventional retaining walls. The structure and the manufacturing process of the liquid crystal panel 103 may be simplified accordingly.

Figure 11:
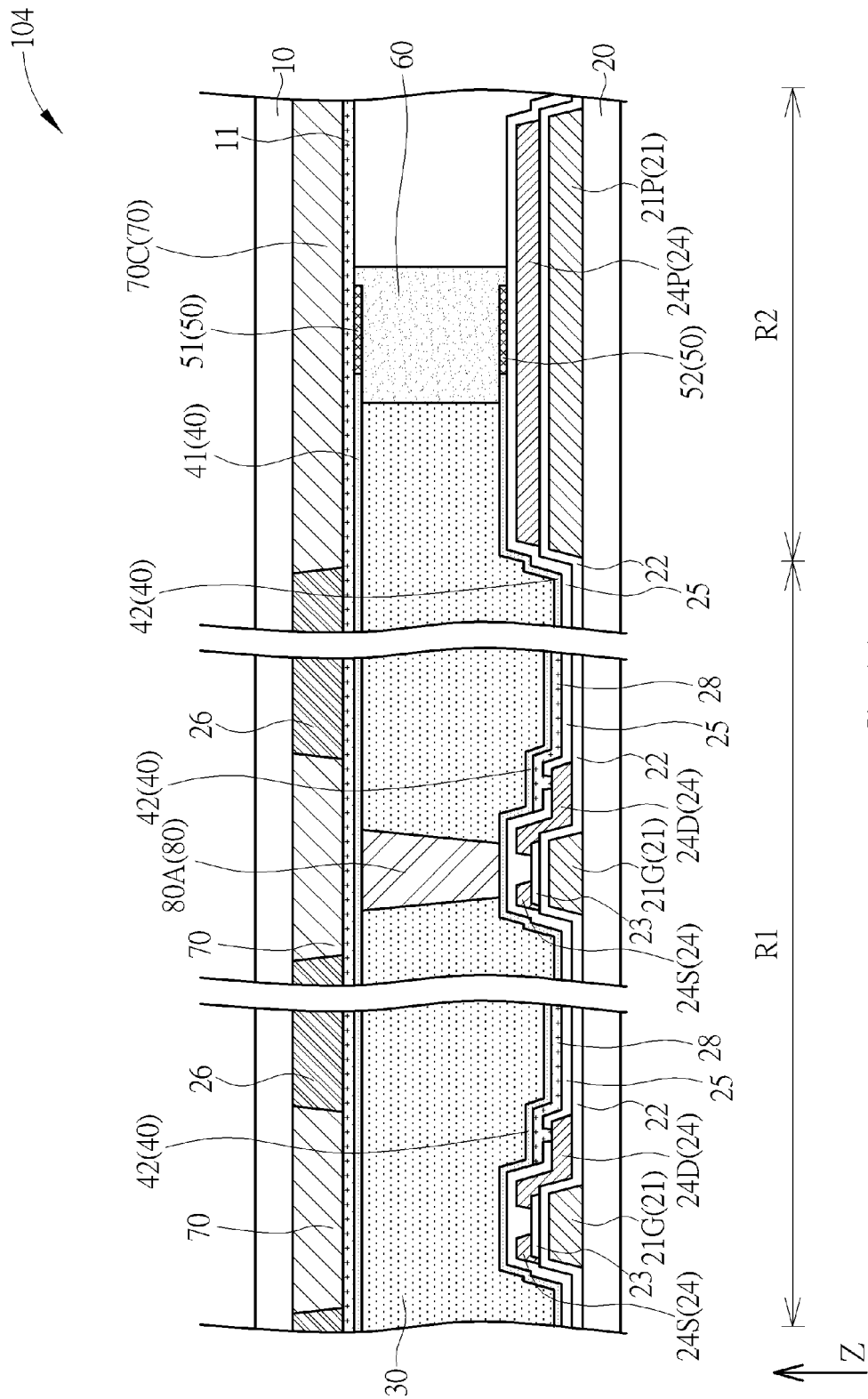
FIG. 11 is a schematic diagram illustrating a liquid crystal panel according to a fourth embodiment of the present invention.

Please refer to FIG. 11. FIG. 11 is a schematic diagram illustrating a liquid crystal panel according to a fourth embodiment of the present invention. As shown in FIG. 11, the difference between the third embodiment and a liquid crystal panel 104 in this embodiment is that the color filter 26 in the liquid crystal panel 104 is disposed on the first substrate 10, the first substrate 10 in this embodiment may be a color filter substrate, and the second substrate 20 may be an array substrate.

Figure 12:
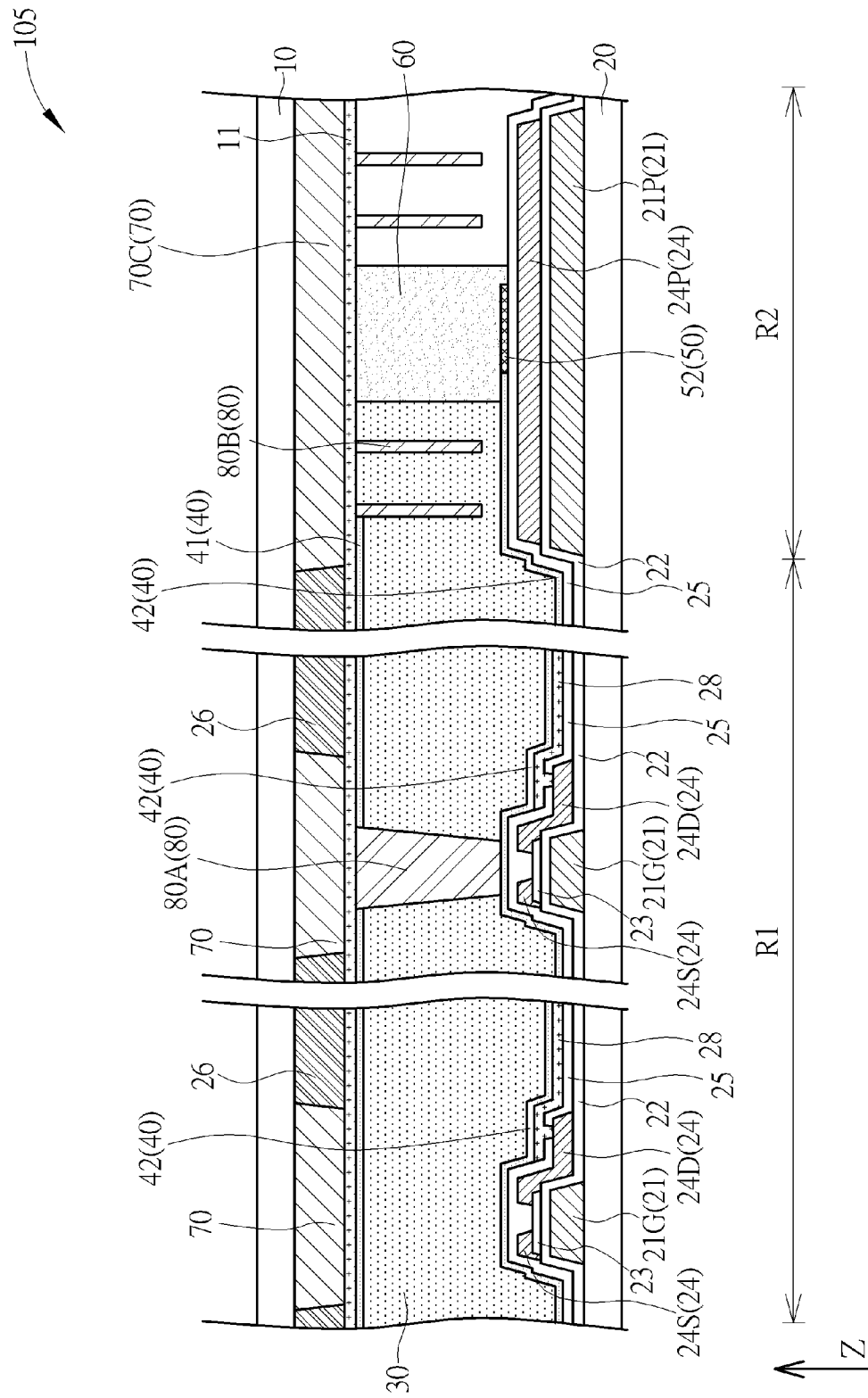
FIG. 12 is a schematic diagram illustrating a liquid crystal panel according to a fifth embodiment of the present invention.

Please refer to FIG. 12. FIG. 12 is a schematic diagram illustrating a liquid crystal panel according to a fifth embodiment of the present invention. As shown in FIG. 12, the difference between the fourth embodiment and a liquid crystal panel 105 in this embodiment is that the patterned water repellent layer 50 in the liquid crystal panel 105 may be only disposed on the second substrate 20, and the first retaining wall 80B disposed on the common electrode 11 may be used to control the distribution of the first alignment layer 41, but not limited thereto.

To summarize the above descriptions, in the liquid crystal panel of the present invention, the patterned water repellent layer is used to control the distribution of the alignment layer formed by the inkjet process without additional retaining wall, and purposes of simplifying the manufacturing process and enhancing the structural design variability may be achieved accordingly. In addition, the patterned water repellent layer may also be formed by an inkjet process, and the inkjet process of the alignment layer may be integrated with the inkjet process of the patterned water repellent layer so as to further simplifying the total processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal panel having a display region and a peripheral region surrounding the display region, the liquid crystal panel comprising: a first substrate;
a second substrate disposed opposite to the first substrate;
a liquid crystal layer disposed between the first substrate and the second substrate; a first alignment layer disposed on the first substrate;
a second alignment layer disposed on the second substrate; and
at least one patterned water repellent layer disposed on the first substrate and/or the second substrate, wherein the patterned water repellent layer is disposed in the peripheral region, and a thickness of the patterned water repellent layer is less than or equal to a thickness of the first alignment layer or a thickness of the second alignment layer; and
a sealant layer disposed between the first substrate and the second substrate, wherein the sealant layer is disposed in the peripheral region, and the sealant layer covers at least a part of the patterned water repellent layer.

2. The liquid crystal panel of claim 1, wherein a surface tension of the patterned water repellent layer is lower than a surface tension of the first alignment layer and/or a surface tension of the second alignment layer.

3. The liquid crystal panel of claim 1, wherein a surface tension of the patterned water repellent layer ranges between 13 dyne/cm and 30 dyne/cm.

4. The liquid crystal panel of claim 1, wherein the patterned water repellent layer comprises a fluoride water repellent material or a silicon based water repellent material.

5. The liquid crystal panel of claim 1, wherein the sealant layer completely covers the patterned water repellent layer.

6. The liquid crystal panel of claim 1, wherein the patterned water repellent layer comprises a closed pattern and/or a block pattern.

7. The liquid crystal panel of claim 1, further comprising a common electrode disposed on the first substrate, wherein the patterned water repellent layer comprises a first patterned water repellent layer disposed on the common electrode, the first alignment layer contacts the first patterned water repellent layer and is disposed on the common electrode, and a thickness of the first patterned water repellent layer is less than or equal to the thickness of the first alignment layer.

8. The liquid crystal panel of claim 7, further comprising a first retaining wall disposed on the first alignment layer, wherein the first retaining wall is disposed in the peripheral region.

9. The liquid crystal panel of claim 1, wherein the patterned water repellent layer comprises a second patterned water repellent layer disposed on the second substrate, the second alignment layer contacts the second patterned water repellent layer, and a thickness of the second patterned water repellent layer is less than or equal to the thickness of the second alignment layer.

10. The liquid crystal panel of claim 1, wherein the second substrate is a color filter on array (COA) substrate, and the first substrate is a counter substrate.

11. The liquid crystal panel of claim 1, further comprising a patterned light shielding layer disposed on the second substrate.

12. A manufacturing method of a display panel, comprising: providing a first substrate and a second substrate;
forming a patterned water repellent layer on at least one of the first substrate or the second substrate;
forming an alignment layer on the first substrate with the patterned water repellent layer formed thereon or the second substrate with the patterned water repellent layer formed thereon, wherein the patterned water repellent layer surrounds the alignment layer, and a thickness of the patterned water repellent layer is less than or equal to a thickness of the alignment layer;
forming a liquid crystal layer between the first substrate and the second substrate; and
forming a sealant layer between the first substrate and the second substrate, wherein the sealant layer covers at least a part of the patterned water repellent layer.

13. The manufacturing method of claim 12, wherein a surface tension of the patterned water repellent layer is lower than a surface tension of the alignment layer.

14. The manufacturing method of claim 12, wherein a surface tension of the patterned water repellent layer ranges between 13 dyne/cm and 30 dyne/cm.

15. The manufacturing method of claim 12, wherein a forming method of the patterned water repellent layer comprises forming a liquid water repellent by an inkjet process, and the liquid water repellent comprises a water repellent material and a solvent.

16. The manufacturing method of claim 15, wherein the water repellent material comprises a fluoride water repellent material or a silicon based water repellent material.

17. The manufacturing method of claim 15, wherein the solvent comprises a non-polar solvent, a polar aprotic solvent, or a polar protic solvent.

18. The manufacturing method of claim 15, wherein the alignment layer is formed by an inkjet process.

19. The manufacturing method of claim 12, wherein the sealant layer completely covers the patterned water repellent layer.

20. The manufacturing method of claim 12, wherein the patterned water repellent layer comprises a closed pattern and/or a block pattern.

21. A liquid crystal panel having a display region and a peripheral region surrounding the display region, the liquid crystal panel comprising: a first substrate;
a second substrate disposed opposite to the first substrate;

a liquid crystal layer disposed between the first substrate and the second substrate; a first alignment layer disposed on the first substrate;

a second alignment layer disposed on the second substrate;

at least one patterned water repellent layer disposed on the first substrate and/or the second substrate, wherein the patterned water repellent layer is disposed in the peripheral region, and a thickness of the patterned water repellent layer is less than or equal to a thickness of the first alignment layer or a thickness of the second alignment layer;

a common electrode disposed on the first substrate, wherein the patterned water repellent layer comprises a first patterned water repellent layer disposed on the common electrode, the first alignment layer contacts the first patterned water repellent layer and is disposed on the common electrode, and a thickness of the first patterned water repellent layer is less than or equal to the thickness of the first alignment layer; and a first retaining wall disposed on the first alignment layer, wherein the first retaining wall is disposed in the peripheral region.

\* \* \* \* \*